Nov. 21, 1933.  A. H. HANNON  1,936,247
PROCESS OF APPLYING CORROSION RESISTING COATINGS TO PIPES
Filed June 25, 1928
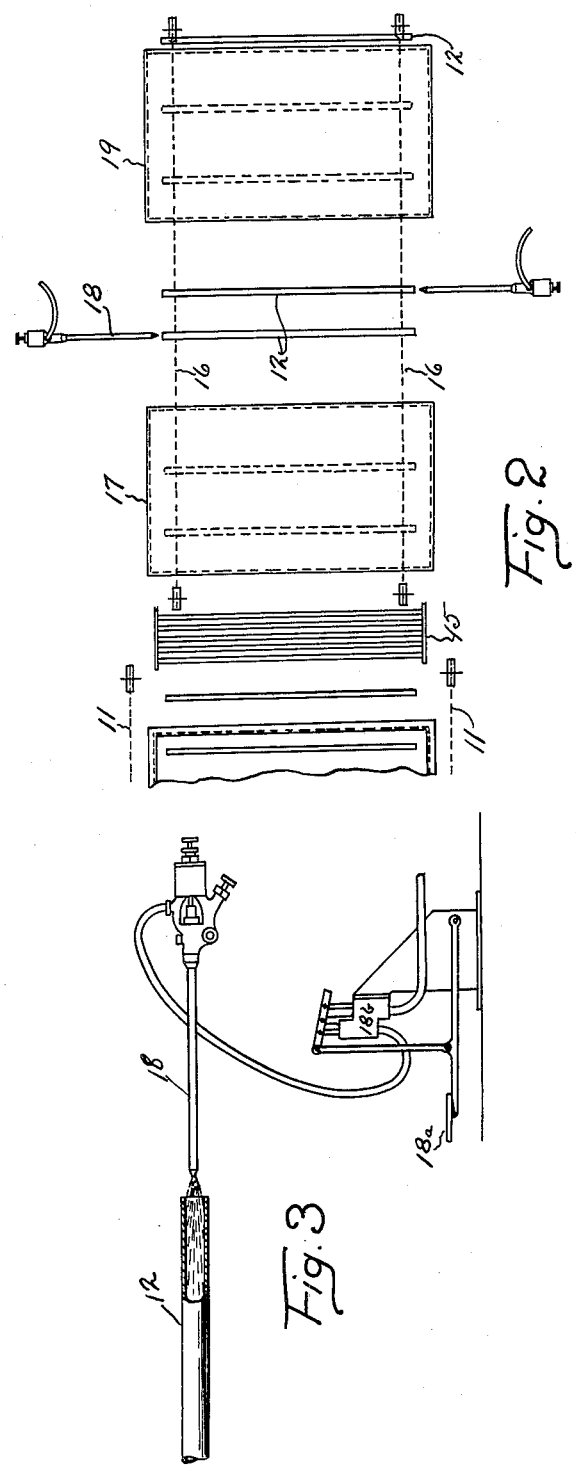
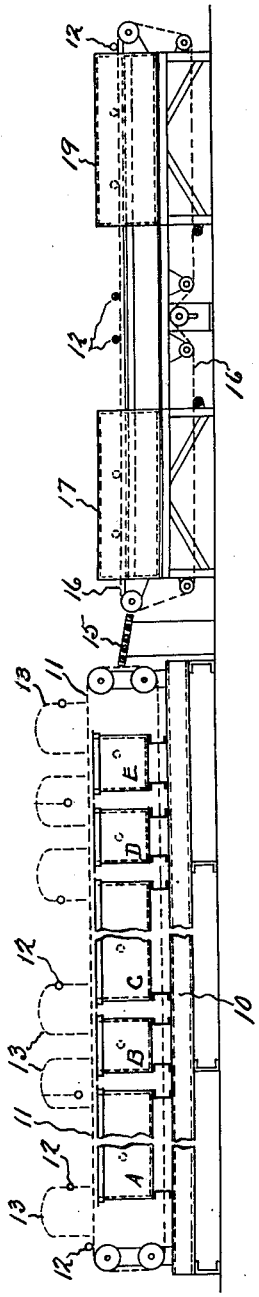
INVENTOR.
Albert H. Hannon
BY
Underwood & Hardesty
ATTORNEYS.

Patented Nov. 21, 1933

1,936,247

UNITED STATES PATENT OFFICE 1,936,247

PROCESS OF APPLYING CORROSION RESISTING COATINGS TO PIPES

Albert H. Hannon, Detroit, Mich.

Application June 25, 1928. Serial No. 288,253

1 Claim. (Cl. 91—68)

The present invention relates to the treatment of tubular articles, particularly, pipes, so as to effectively prevent corrosion of said articles and to provide them with a smooth, more or less electrically insulating interior surface.

Among the objects of the invention is a method of treating such articles so as to render such treatment more efficient and expeditious.

Another object is a method of treatment of such articles so as to coat the same and to decrease the cost of such operations by more effective application of the coating materials.

Still other objects will readily occur to those skilled in the art upon reference to the following description and accompanying drawing wherein an illustrated embodiment of the apparatus desirable for use in carrying out the process is shown and in which Figure 1 is a more or less diagrammatic side elevation of such apparatus.

Figure 2 is a partial plan view thereof, and

Figure 3 is an enlarged conventional representation of a portion of the apparatus.

In the treatment of pipes or other tubular articles for the application of coating thereof, it is customary to thoroughly clean the articles and then to dip it in a suitable bath of coating material, but such processes are somewhat wasteful and offer more or less difficult to handle while the dipping, of course, coats both the inside and the outside, which latter is in most cases unnecessary.

In the present process, the handling of the articles is simplified because only sufficient of the coating material is used to properly cover the surface to be coated. The handling of the articles may be carried out automatically by the use of apparatus similar to that shown in my co-pending application, Serial No. 375,128 filed July 1, 1929. Such apparatus is indicated diagrammatically in Figure 1 in which is shown a base frame work 10 supporting thereon a series of tanks A, B, C, D, and E. Also mounted on the base 10 is a conveyor 11 which passes along the tops of the tanks and back thereunder to the starting point. This conveyor is adapted to carry the articles on suitable hangers, which are indicated at 12, lengthwise of the tanks, while transfer means is indicated by the dotted lines 13. This transfer means consists of apparatus adapted to lift the articles from the conveyor 11 out of a tank and move them forward and lower into the next tank and engage them with the conveyor 11. The latter conveyor then moves the article slowly through the tank to the next transfer means 13.

The last transfer means 13 lifts the article from the last tank and deposits them upon the conveyor 11 which in turn will deposit them on the receiving platform 15 from which they are removed by a second conveyor 16 which carries them through a drier 17.

After the articles have been thoroughly dried they pass from the drier 17 to an intermediate space and at this point they are treated to an internal spray of coating material from the sprayers 18 suitably controlled by a pedal 18a operating a compound valve 18b. These sprayers are preferably of such length that they will enter the article and extend to a point about half way of the length thereof. As the sprayer is withdrawn, it is operated to coat the interior of the pipe or other tubular article with a spray of a suitable coating material.

When the articles have been thus coated internally, they are then carried through a second drier 19 and are then removed and carried away for use or storage.

The process consists in first effectively cleaning the tubes or pipes, then coating the articles with a metallic coating, then applying to the surface by spraying a comparative thin layer of a suitable coating material, such as a suitable paint, or asphaltum composition or other material providing a coating having the desired characteristics and subsequently thoroughly drying the coated article.

If an electroplating process is used as the metal coating step, an intermediate washing step after the metal coating operation will be found desirable and in such case, the article must be thoroughly dried before spraying.

The apparatus indicated in the drawing is one which is particularly effective in electroplating and it is contemplated to coat the articles with a coating of metallic zinc as the metal coating step, washing off the remaining electrolyte, drying and spraying the interior of the pipe with, for example, a suitable asphaltic coating material which is in turn dried.

The specific apparatus which it is proposed to use in carrying out the present process is not being made a part of the present application and only the process is being claimed herein.

Now having described the invention and its preferred form of embodiment, it is to be understood that the said invention is to be limited, not to the specific details herein set forth but only by the scope of the claim which follows.

What I claim is:

The process of coating the interior surface of an elongated tube, which includes the steps of supporting the tube and moving the tube into alignment with the spraying device by moving the supporting means, inserting a spraying device into the tube, withdrawing the spraying device, and as it is withdrawn operating said device to coat the interior of the pipe, moving the tube out of alignment with the spraying device and subsequently moving an additional tube into alignment with the spraying device.

ALBERT H. HANNON.